Nov. 15, 1932.                R. CHILTON                1,887,543
                        VARIABLE PITCH PROPELLER
                    Filed Feb. 15, 1929    3 Sheets-Sheet 1
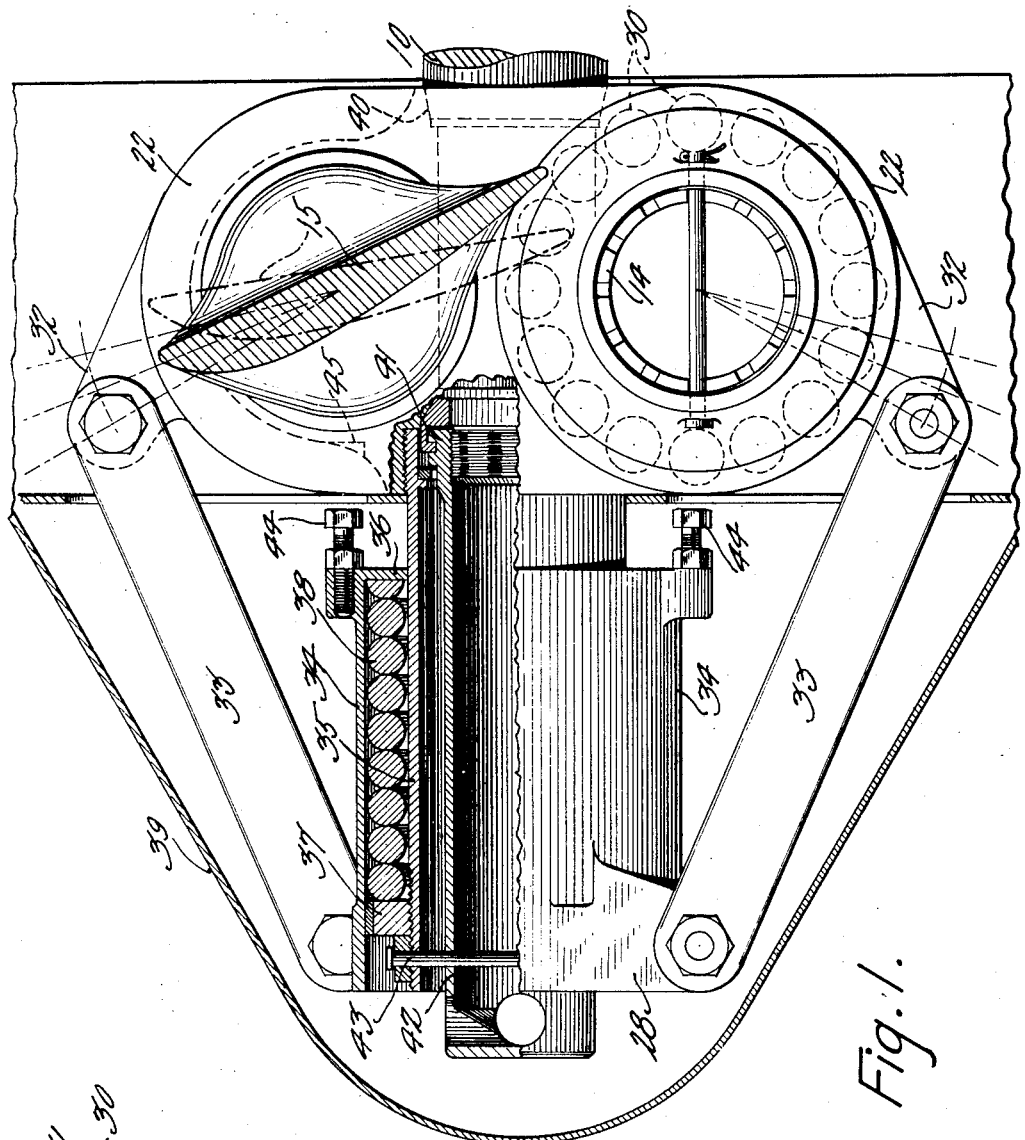
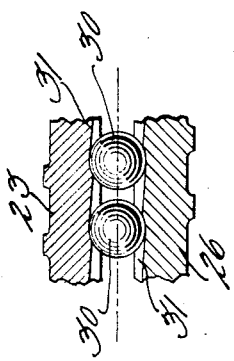
INVENTOR
Roland Chilton
BY
ATTORNEY

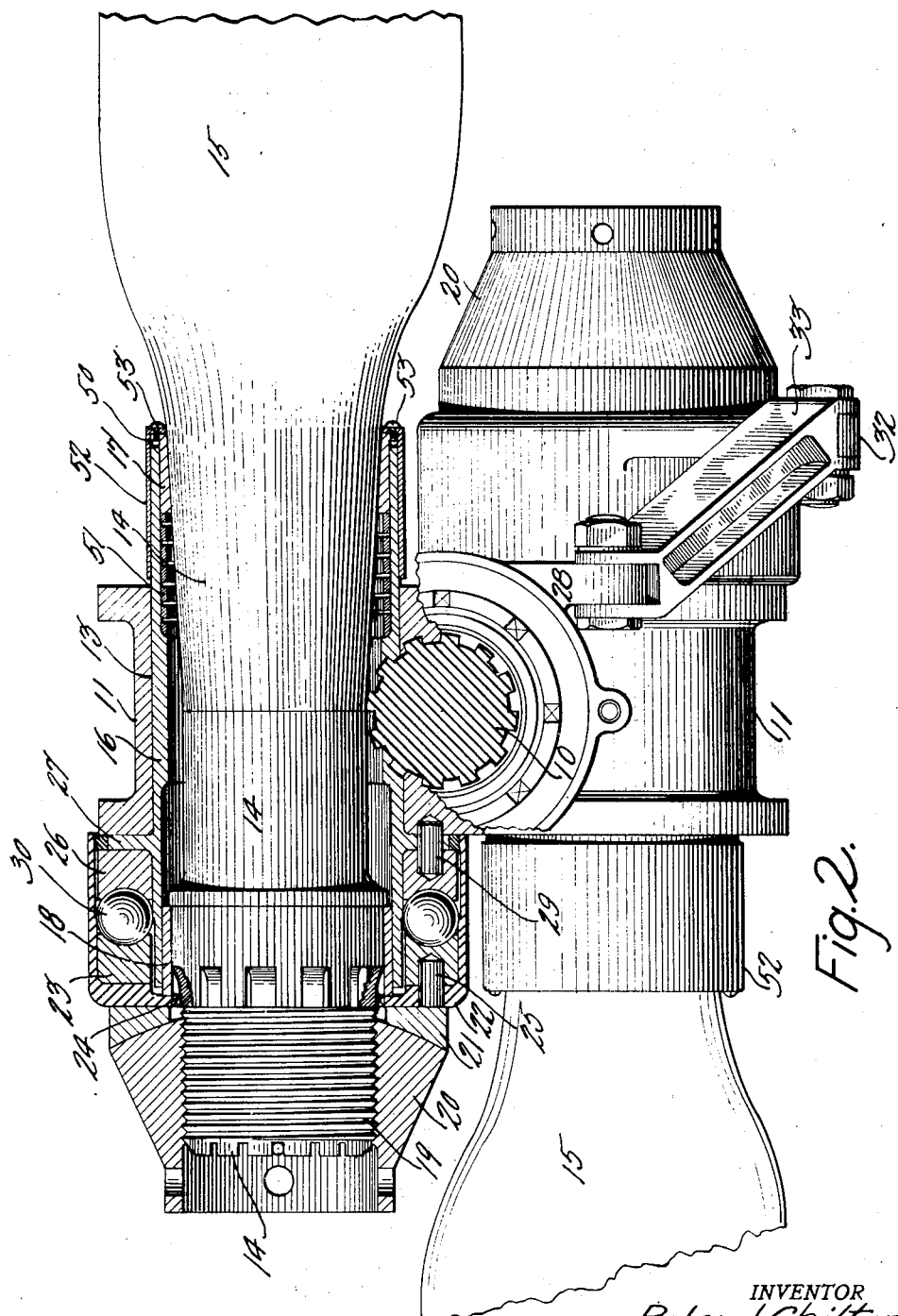

Nov. 15, 1932.     R. CHILTON     1,887,543
VARIABLE PITCH PROPELLER
Filed Feb. 15, 1929     3 Sheets-Sheet 3

INVENTOR
Roland Chilton
BY
Werner
ATTORNEY

Patented Nov. 15, 1932

1,887,543

UNITED STATES PATENT OFFICE

ROLAND CHILTON, OF KEYPORT, NEW JERSEY, ASSIGNOR, BY MESNE ASSIGNMENTS, TO AEROMARINE PLANE & MOTOR COMPANY, INC., OF KEYPORT, NEW JERSEY, A CORPORATION OF NEW YORK

VARIABLE PITCH PROPELLER

Application filed February 15, 1929. Serial No. 340,214.

This invention relates to propellers adapted to generate an axial thrust due to rotation in a fluid medium, the embodiment shown and described being particularly suited for aircraft.

An important object of the invention is to provide a propeller which shall be self-adjusting as to pitch in response to variations in the rotational speed. The most efficient pitch for a propeller is a function of the forward speed of the aircraft while (under constant torque and pitch conditions) the rotational speed of a propeller varies with the forward speed. Thus the full throttle revs. per minute of an aircraft power plant and propeller "on the ground" is lower by some hundreds of revs. than the full throttle revs. in level flight. This invention aims at utilizing this speed change to automatically increase the pitch of the propeller blades to give the desired low pitch for taking-off, increasing to a maximum pitch as full speed is approached.

Airplane propeller blades are subject to extremely high centrifugal tension due to their high velocity of rotation and severe bending moments are engendered at the root of the blades by the thrust and torque loads thereon. It has been previously proposed to mount propeller blades in a hub for oscillation about the longitudinal axis of the blades in order to vary the pitch, but the bearings of the blades in the hub are subject to very heavy loading from the above mentioned causes, and hence very great effort may be necessary to insure positive control of the blade angle. Also, as the pitch or angle of the attack of the blades is changed the aerodynamic reactions vary, tending to produce turning moments on the blade which may assist or retard the desired adjusting movement. The loads on the operating mechanism are accordingly very heavy and variable and relatively great power must be exerted to adequately control the blades.

To overcome these difficulties hydraulic and other external sources of power have been proposed in the prior art but these lead to considerable complications, weight and expense and involve external connections between the rotating propeller and the control means.

An important object of this invention is to avoid these complications and to make the adjusting mechanism self-contained within the propeller. The control being responsive to the change in propeller speed (as determined by the engine throttle setting in relation to the speed of flight), the device of this invention may be described as "automatically throttle controlled", and this elimination of the extraneous control means of the prior art is an important object of this invention.

To these ends the propeller blades are mounted for oscillation in the hub and are provided with means which generate a turning tendency on the blade proportional to the centrifugal force and this turning tendency is opposed by an adjustable spring means organized for unitary rotation with the propeller as a whole. The mechanism is so proportioned and adjusted that the turning tendency of the blades within the hub overcomes the spring means at a preset speed whereupon the pitch of the propeller increases and, by suitably proportioning the mechanical ratios in the mechanism involved, the change from minimum to maximum pitch may be made to occur over any desired speed range. For example; in a specific case, the full throttle R. P. M. "on the ground" may be 1700 and the full throttle R. P. M. in full flight 2000 and the mechanism may then be adjusted to change from minimum to maximum pitch in the range between 1700 and 1750 R. P. M.

For best economy it is the practice, in level flight, to throttle back substantially below the maximum R. P. M., this reduced engine power being the normal "cruising speed" condition. When the pitch variation occurs within a narrow range in this zone it will be seen that the pitch of the propeller in flight may be adjusted by mere manipulation of the throttle without departing from the desired economical cruising R. P. M. thus giving the desired combination of a selected high pitch at reduced throttle opening which will afford a minimum cruising R. P. M.

which is aimed at in aircraft operation in order to prolong the life of the power plant.

It will be understood that the efficiency of the propeller varies with the percentage of "slip" i. e., the percentage by which the forward speed of the plane is less than the theoretical rate of advance due to the actual pitch of the blades. Thus if a propeller has a 10 ft. pitch and the aircraft advances only 8 ft. per turn the slip is said to be 20 per cent and loss of efficiency occurs if some such ratio be exceeded. It will further be seen that, for maximum thrust at the relatively slow speed of "taking off", a much lower pitch is desired than at the increased speeds of free flight. The thrust available for "taking off" with fixed pitch propellers is relatively low on account of the excessive slip and the pitch is usually made less than that most efficient for maximum speed in order to compromise the two conflicting requirements. A prime object of this invention is to automatically provide the most effective pitch for each condition.

Centrifugal control means for varying the pitch of propellers have been previously proposed but the necessary control forces are so large that the centrifugal means must have relatively great weight and radius of rotation to generate sufficient force for positive control. Extraneous weights having the necessary mass and radius would greatly increase the weight and head-resistance and an essential feature of this invention is the utilization of the necessarily heavy and large radius propeller blades themselves as the centrifugal control means.

To this end the thrust of each propeller blade in this invention is taken by anti-friction thrust bearing means adapted to generate a rotational tendency on the blade within the propeller hub proportional to the centrifugal force, i. e., proportional to the square of the speed. Each blade is equipped with a lever and link by which it is connected to a common spring means which opposes this rotational tendency.

Owing to the large bending moment at the root of the blades, a wide spacing of the bearings of the blades in the hub is desirable, and this may lead to an undesirable extreme hub diameter when radial blades are used as in the prior art. In this invention accordingly the blades are disposed to overlap tangentially to the drive shaft whereby their bearings in the hub may be widely separated whilst maintaining a moderate overall hub diameter.

Owing to the extremely great centrifugal force involved, the root diameter of the blades and of the anti-friction pitch control thrust means are relatively great and would lead to bulky hub sleeves in a propeller having the conventional radial blade disposition. With the tangential disposition of this invention on the contrary, the hub takes the form of a cross-head secured to the drive shaft, the anti-friction thrust means merely abutting this head and being maintained thereagainst by centrifugal force thus eliminating the extended sleeves which are subject to the full centrifugal force in conventional detachable blade propellers.

Various other objects and advantages of the invention will be in part obvious from an inspection of the accompanying drawings and a careful consideration of the following particular description and claims of one form of mechanism embodying my invention.

In the drawings:

Figure 1 is a longitudinal section of the invention.

Figure 2 is a front elevation partly in section.

Figure 3 is a detail sectional view.

Figure 4:
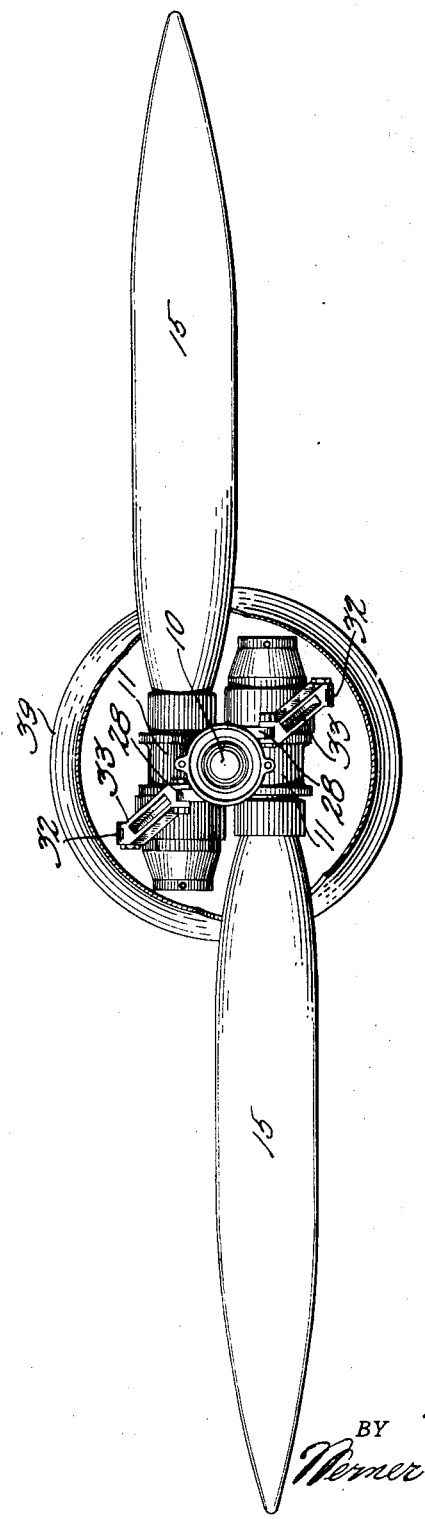
Figure 4 is a front elevation of the invention on a reduced scale.

Referring more particularly to Figure 2, 10 designates the propeller shaft-end of the power plant to which is splined the hub member 11 which extends transversely of the shaft and has two tangential and parallel bores 13 disposed so that the shanks 14 of the propeller blades 15 will be on either side and clear of the propeller shaft 10. Secured in these bores (preferably by a shrink fit) are the sleeves 16 which extend on each side of the hub, forming bearings for the journal bushings 17 and 18. The shanks 14 of the blades are extended beyond the sleeves 16 and provided with a large screw thread at 19 to which the nut 20 is applied. A spherical or self-aligning washer 21 abuts the lever-cups 22 which in turn abuts an annular race member 23 which last is thus secured to the blade against centrifugal force. The lever cup 22 is splined to the blade at 24, and the race way 23 is pinned against rotation in the lever cup at 25. A further annular race 26 abuts the flange 27 of the sleeve 16 and is pinned against rotation to the hub at 29, both of said races being disposed co-axial with the shanks 14 and provided with undulating faces arranged in opposed relation.

Between the races are the balls 30 (Figure 3) the race ways being inclined at each ball contact as at 31 so that the centrifugal pull of the blades exerts a turning tendency thereon. The cups 22 are provided with integral lever extensions 32 to which are pin-jointed the links 33, which are in turn pin-jointed to the sleeve 34 at 29 so that rotation of the levers 32 with the associated propeller blade produces an axial travel of the sleeve 34. This sleeve is mounted for axial movement on a cylindrical extension 35 rigid with the propeller hub and the spring abutment 36 of the sleeve and the spring adjusting nut 37 screwed on the extension 35 comprise guides which prevent tilting of the sleeve 34 so that the blades are restrained to equal angular movement at all times.

Between the abutment 36 and the adjusting nut 37 is the control spring 38 which elastically opposes the movement of the sleeve 34 to the right in Figure 1, and accordingly opposes an increase in pitch of the blades due to the turning reactions generated from the centrifugal forces by the balls 30 and the inclines 31. It will be noted that in Figure 1, the parts are shown as in the high speed position, i. e., with the blades at maximum pitch and the spring 38 fully compressed with the sleeve 34 moved to its extreme left hand position.

It should also be noted that there will be a slight axial movement of the blades 15 resulting from the action of the inclined faces of the thrust bearings, and to permit of such movement, there is a clearance provided at 50. A spring 51 is interposed between the bushing 17 and the sleeve 16 to maintain the thrust bearing parts in their effective relation.

To prevent the centrifugal force from driving out the lubricant contained in the sleeves 16, oil retaining cups 52 are provided which are attached to the bushings 17 by the screws 53 and which extend towards the hub 11, said cups being slidably mounted over the sleeves 16 so as to move axially with the blades.

The entire hub mechanism is covered by a stream-line spinner 39 and the hub is secured to the splined drive shaft by the conventional tapered collars 40. The securing nut 41 however has a tubular extension 42 which extends beyond the sleeves 34 for easy access for tightening up. This nut extension and the adjusting nut 37 are locked by the cross pin 43.

As viewed in Figure 2, it will be seen that the disposition of the pin joints in the links 33 are such that they all lie on a common radial line, whereby the rotational reaction on the sleeve 34 is avoided. Stop screws 44 are adapted to contact with the hub at 45 and afford an adjustment for the minimum pitch angle of the blades. The limit of maximum angle is afforded by the closing up of the spring 38 while the initial pressure at which the blade angle starts to increase is adjusted by the nut 37 and the final pressure by the "rate" of the spring which may be proportioned to cause the angular change to occur in the desired speed range.

The operation of the device is as follows:

Inasmuch as the race 23 is secured rigidly to the propeller blade whilst the race 26 is secured rigidly to the propeller hub, the co-operation of the inclined faces 31 of these races with the balls 30 due to centrifugal force generates a rotative reaction on the blades. This reaction is transmitted to the spring 38 by the sleeve 34, the links 33 and the levers 32 which are also rigid with the associated propeller blade, thus the angle of the blade increases as the speed increases over the preset range as previously described.

Variations may be resorted to within the scope of the invention and portions of the improvements may be used without the others, whilst not departing from the spirit of the invention.

Having thus described my invention, I claim:—

1. In a variable pitch propeller, the combination of a hub, blades mounted in said hub for rotational movement about their axes, thrust bearing means comprising races having pockets with inclined faces, rolling members engaged with said inclined faces and adapted to co-act therewith in a manner as to generate a rotational movement of the blades from the centrifugal forces thereof, and a yieldable means tending to oppose said rotational movement.

2. In a propeller mounting adapted for the reception of a plurality of blades, in combination, a hub member, propeller blade sleeves rigid therewith, thrust bearing means comprising relatively fixed and movable rings having undulating faces respectively secured to said sleeves and blades, rolling contact means between said faces; the whole being responsive to an axial thrust of the blades to cause a pitch changing movement thereof, a preset spring means, and lever means rigid with the movable rings and connected to said spring means; said spring means adapted to control the pitch changing movement of the blades over a predetermined speed range.

3. In a propeller having blades journalled in a hub for pitch adjusting movement, a spring means, connecting means between the spring means and the blades restraining the latter to equal angular movement, and rolling contact means responsive to the centrifugal force of the blades tending to rotate the blades in opposition to the spring means; said means including circumferential roll tracks disposed co-axial with the blades and having a plurality of inclined faces.

4. In a variable pitch propeller, the combination of a hub adapted to receive a plurality of propeller blades, rolling contact means, cam faced rings cooperating with said rolling contact means and responsive to the centrifugal action of the blades to cause said blades to alter their pitch in accordance with the rotational speed, and preset yielding means to control said movement.

5. A rotary propeller, the combination of a hub having rigid sleeves transversely disposed to the axis of rotation, pitched propeller blades journalled for rotation in said sleeves for change in pitch, anti-friction thrust bearings comprising a plurality of circumferential roll tracks provided with faces inclined so as to impose a rotational reaction on the blades from the centrifugal thrust thereof, and yielding means tending to return the blades to an initial position.

6. A propeller comprising in combination, a driven hub, a plurality of blades set into the hub for movement relatively thereto to vary the pitch of the blades, rolling contact means including rings having cam-faced races responsive to the centrifugal action of the blades to urge them towards a high pitch position, and preset yielding means tending to urge them towards a low pitch position.

7. In a propeller having blades movable in a hub to change the pitch angle, the combination of rolling contact thrust bearing means for the blades having cam-formed raceways adapted to resist the centrifugal pull of the blades and to generate therefrom said pitch changing movement, and means adapted to elastically oppose such movement.

8. In a pitch changing propeller having a plurality of blades mounted in a hub, in combination, a thrust bearing for each blade comprising an element secured to the hub, a further element secured to the blade and adapted for rotation relative to the first said element, rolling contact means between said elements, said rolling contact means coacting with said elements to convert axial pressure imposed thereon into a rotation of the second said element, and yielding pressure means tending to return each blade to an initial position.

9. In a pitch changing propeller having a plurality of blades mounted in a hub, in combination, a thrust bearing for each blade comprising an element secured to the hub, a further element secured to the blade and adapted for rotation relative to the first said element, rolling contact means between said elements, a spring effective upon the blade to maintain the same in a low pitch position; said elements being provided with inclined faces adapted to co-act with the rolling contact means in response to the thrust of the blade to cause a limited rotation of the blade in opposition to said spring means.

10. In a propeller, in combination, a hub comprising a cross-head extending transversely of the axis of rotation, propeller blade bearing sleeves inserted in and extending transversely from said cross-head in opposite directions, blades in said sleeves, antifriction thrust bearing means having cam faced portions adapted to effect a pitch changing movement of said blades, and yielding power means tending to oppose said pitch changing movement.

Signed at Keyport, in the county of Monmouth, and State of New Jersey this 14th day of February, 1929.

ROLAND CHILTON.